United States Patent
Bourne

(10) Patent No.: US 7,500,608 B2
(45) Date of Patent: *Mar. 10, 2009

(54) METHOD FOR DOING BUSINESS WITH COLLISION CENTERS

(75) Inventor: Robert D. Bourne, Roswell, GA (US)

(73) Assignee: FinishMaster, Inc., Indianapolis, IN (US)

( * ) Notice: Subject to any disclaimer, the term of this patent is extended or adjusted under 35 U.S.C. 154(b) by 767 days.

This patent is subject to a terminal disclaimer.

(21) Appl. No.: 10/930,685

(22) Filed: Aug. 30, 2004

(65) Prior Publication Data

US 2005/0154647 A1 Jul. 14, 2005

Related U.S. Application Data

(63) Continuation of application No. 10/429,279, filed on May 2, 2003, now Pat. No. 6,805,292, which is a continuation of application No. 09/694,122, filed on Oct. 20, 2000, now Pat. No. 6,575,365.

(60) Provisional application No. 60/161,127, filed on Oct. 22, 1999.

(51) Int. Cl.
G06F 19/00 (2006.01)
G06Q 30/00 (2006.01)
G06Q 90/00 (2006.01)

(52) U.S. Cl. .................. 235/385; 235/462.01; 235/375

(58) Field of Classification Search ............... 235/385, 235/462.01, 375, 379, 380, 381, 382, 382.5, 235/383; 707/2, 502; 705/8, 22, 28, 29

See application file for complete search history.

(56) References Cited

U.S. PATENT DOCUMENTS

| | | | |
|---|---|---|---|
| 5,231,585 A | 7/1993 | Kobayashi et al. | |
| 5,526,520 A | 6/1996 | Krause | |
| 5,819,232 A | 10/1998 | Shipman | |
| 5,884,300 A | 3/1999 | Brockman | |
| 6,015,167 A | 1/2000 | Savino et al. | |
| 6,068,188 A | 5/2000 | Knowles | |
| 6,134,557 A | 10/2000 | Freeman | |
| 6,575,365 B1 * | 6/2003 | Bourne | .................. 235/462.01 |
| 6,805,292 B2 * | 10/2004 | Bourne | ...................... 235/385 |
| 2002/0035538 A1 | 3/2002 | Moreau | |
| 2002/0069166 A1 | 6/2002 | Moreau et al. | |

* cited by examiner

Primary Examiner—Kumiko C Koyama
(74) Attorney, Agent, or Firm—Barnes & Thornburg LLP

(57) ABSTRACT

A method and system for the supply of automotive collision centers is provided, which includes a Customer, Jobber, and intermediate Order Manager. The Customer will fax, phone, email and most importantly e-Commerce the order to the Order Manager, who passes it on to the Jobber. Then the Order Manager will in turn fax, call, email and send over the Internet and/or intranet the order to a jobber who is local Order Manager Affiliate. Under one particularly important part of the invention, orders are scanned at the customer's physical location, passed through the Order Manager's system, and entered directly into the legacy system of the jobber, saving a great deal of time and effort.

7 Claims, 1 Drawing Sheet

METHOD FOR DOING BUSINESS WITH COLLISION CENTERS

CROSS-REFERENCE TO RELATED APPLICATIONS

The present application is a continuation of U.S. application Ser. No. 10/429,279 filed May 2, 2003 now U.S. Pat. No. 6,805,292; which is a continuation of U.S. application Ser. No. 09/694,122 filed Oct. 20, 2000 (now U.S. Pat. No. 6,575,365 issued Jun. 10, 2003), which claims full priority to provisional patent Application No. 60/161,127 filed Oct. 22, 1999, entitled "Method of Doing Business with Collision Centers". The present application claims the full benefit and priority of all of these application Ser. Nos. 10/429,279, 09/694,122, and 60/161,127, and incorporates by reference the contents of each application.

FIELD OF THE INVENTION

The present invention generally relates to methods of doing business with automotive "collision centers", otherwise known as "body shops".

BACKGROUND OF THE INVENTION

It is well known for "jobbers" to provide "collision centers" (a.k.a. body shops) with supplies, such as paint, sandpaper, tape, etc. Typically the ordering process is as follows. The jobber (which can be an independent or a company owned store) receives the order from the collision center (a.k.a. "customer") by phone or fax, fills the order and delivers the order to the customer.

Discussion will now be made about the particular products involved and why they tend not to be sold any other way than ordered through local jobbers at the local level. The products under discussion are heavy, hazardous and flammable. After being sold, the unused portions become hazardous waste. Because of shipping charges and government regulations, to date it has been unrealistic to sell outside one's local area. So that made internet selling not very appealing.

SUMMARY OF THE INVENTION

The invention overcomes deficiencies in the art by providing a method and system for the supply of automotive collision centers is provided, which includes a Customer, Jobber, and intermediate Order Manager. The Customer will fax, phone, email and most importantly e-Commerce the order to the Order Manager, who passes it on to the Jobber. Then the Order Manager will in turn fax, call, email and send over the Internet and/or intranet the order to a jobber who is local Order Manager Affiliate. Under one particularly important part of the invention, orders are scanned at the customer's physical location, passed through the Order Manager's internet-based system, and entered directly into the legacy computer system of the jobber, saving a great deal of time and effort.

Generally described, the present invention provides a method for providing supplies to an automotive Collision Center from a Supplier having a legacy computer system, the method comprising the steps of a) establishing an internet web site, the web site supervised by an Order Manager and including subsections assigned to a plurality of Suppliers, each Supplier including unique SKU numbers associated with the inventories of the Suppliers, b) providing scannable indicia on the bins of the Collision Center, the scannable indicia corresponding to the SKU numbers, c) providing a scanner and associated hardware at the location of the Collision Center, the scanner and associated hardware configure to allow one to scan the indicia on the bins and to transfer order information associated with the goods intended for the bins to the internet web site; and d) providing a connection between the internet web site and the legacy system of the Jobber to allow the orders previously scanned to be entered directly into the legacy system from the web site.

Therefore it is an object of the present invention to provide an improved method and system of using same for processing orders for providing supplies to an automotive collision center.

Therefore it is an object of the present invention to provide an improved method and system of using same for processing orders for providing supplies to an automotive collision center from a supplier.

It is a further object of the present invention to provide an improved method and system of using same for processing orders for providing supplies to an automotive collision center from a supplier having a legacy computer system.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

Figure 1:
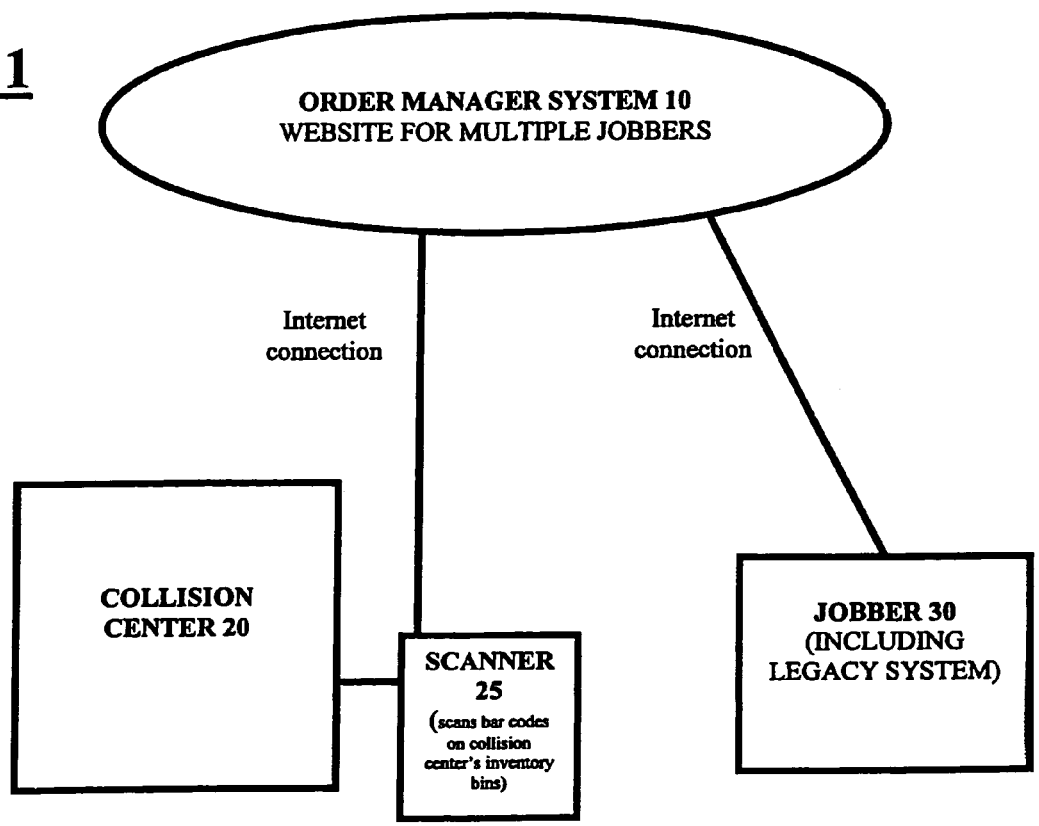

Having thus described the invention in general terms, reference will now be made to the accompanying drawings, which are not necessarily drawn to scale.

FIG. 1 is an illustrative view showing the relationship between an exemplary Jobber, and exemplary Customer, and the Order Manager.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

General Operation

As noted above, the present invention, an "order taking system" known presently under the trademark "SupplyLine", referenced generically herein as "Order Manager" sets forth a new way of doing business for our industry.

With SupplyLine in force it will go like this. The customer (at 20) will fax, phone, email and most importantly e-Commerce the order to the system 10 of the Order Manager, who passes it on to the jobber. Then the Order Manager will in turn fax, call, email and send over the Internet and/or intranet the order to a jobber who is local SupplyLine Affiliate (generically also referenced as an Order Manager Affiliate or Jobber 30). Under one particularly important part of the invention, orders are scanned at the customer's site, passes through the Order Manager's system, and enter directly into the legacy system of the jobber, saving a great deal of time and effort.

More Detailed Operation

The Order Manager at 10 according to the present invention is not just an internet store. It's a new method of how to do business with collision centers. It is a web site with the full catalog offering of the local jobber that serves the collision center in their local area. The site does much more than orders products. Applicant will now attempt to take you through the entire process. This is in the order that events would unfold.

1. The local jobber 30 signs up with Order Manager (a.k.a "SupplyLine™ ") to be an Order Manager Affiliate of SupplyLine. This is done either online or over the phone or in person. By being an Order Manager Affiliate the jobber gives up none of his rights as a local businessman. He is just now a member of an Affiliate group designed to better serve his collision customers.

2. After sign up is complete, the Jobber would provide for Order Manager the SKUs that the jobber carries in his inventory. This is given to Order Manager in any type file that the Jobber can provide through the Jobber's particular legacy system. Once the item file is provided to Order Manager, Order Manager loads the items, prices and sku's for the Jobber and helps the Jobber establish the catalog the Jobber will be offering. This is set up on a web site that is hosted by the Order Manager, although as noted below the Jobber will be able to limited access and editing capabilities to the a portion of the web site assigned to the Jobber. This gives the Jobber his "own web site", which includes the jobber's catalog from which customers can order if desired.

3. Order Manager then trains the Jobber how to upload new catalog offerings the Jobber may want to make available to the Jobber's customers on the Jobber's "mini"-web site. This training also includes training on the mini-web site for the Jobber's store that the Jobber can customize to fit the Jobber's needs.

4. Once the Jobber's web site at 10 is established and catalogs in place, the Jobber is ready to start setting up the Jobber's assigned shops, i.e., the Jobber's particular Customers. First the Jobber barcodes the bins in the Customer's shop at 20 to reflect the items that the Customer's shop uses on a regular basis. After the bar coding is complete, the internal workings of the site can be set up further. By this is meant the shop is ready to establish who can buy what, when and under what budget restraints.

5. The orders are placed from the customer to the web site overseen by the Order Manager in a multitude of ways. One way is that the collision shop goes directly to the site and orders. He would use the search catalog function or he could use the quick order form or the standard item form to get his items selected from the site. Once he has selected the items and department they are being ordered for, he selects "place order" and away the order goes.

6. An alternate ordering technique is as follows. In this case, the jobber has provided the collision shop with their own automated entry device such as a scanner 25 or the jobber may come to the shop and place the orders for him, either way a scanner or other automated entry device is involved. An off-the-shelf program is the used as known in the art to read the barcodes on the bins, and enter the order into the scanner. The order is then passed to the web by use of a computer and a personal digital assistant (PDA) having a scanner cradle (holder) to link it into the web, a cell phone and portable modem to get the order to the server on the web, or other means known in the art. It is recognized that the scanner device will change and so will the technology to send it to the server in the coming years. We are currently using the PALM™ Scanner from Symbol™, but this is cited as an example only and should not be construed as limiting.

7. Suppose we now have gotten the order to the web, that does not mean that the order has been placed into the Jobber's system. However, under the present invention the jobber has the option of having his orders come from the server by fax, email, EDI or directly inputted into his legacy system at his jobber location. Under the last version, the jobber has NO data entry to do at all. The scanner in the shop, or the person ordering from the web, did all the data entry that was needed, and software such as known in the art is configured to allow direct entry from the web to the Jobber's computer system. This is done by processes such as known in the art, but one process is by use of an FTP application which downloads a file into the jobber' legacy system at 30 once per minute. The jobber can be given a password to accomplish this. While on this subject, the customer can also access his order information via the web by use of suitable password access.

The order coming into the legacy systems is an important part of the invention. Orders flow directly from the scanner at the shop level, through the Order Manager's web site, to the jobbers own computer system. The order can appear on the machine in a variety on ways, but mostly it would appear in the form of a pick ticket or a special order until it was verified and picked. Once that was complete, the order can be changed by definition into an invoice. Again note the inventive concept of using bar codes and scanners coupled with comprehensive management features designed to facilitate the procurement process with as little human input as possible.

8. Now on to the site's management features.

Set up purchase order standards:

The shop can decide if they want to set up purchase orders in several different ways. (a). The purchase orders can be automatically numbered either company wide or by department. Each department can have their own prefix or the shop can have just one prefix. (b). Blanket PO's that cover all purchases for a given period or all year. (c). No PO's. (d). As discussed before, the PO's can have any prefix the jobber or shop decides for any and all departments.

Budget Standards

This is a section where the shop decides what period to have for reporting.

Month, Quarter, or Year

Departments—The jobber or shop sets up departments within the collision shop. This might be the paint shop or metal shop; detail or new car gets ready. The idea is to set up as many departments as needed to allow the shop to track their supplies. Once the shop has set these departments up, they assign a budget amount to that department that the buyers and managers will be allowed to purchase within the given period.

Buyers and Managers—This function allows the shop manager to assign different levels of entry to the system. Buyers are allowed to use the system to purchase, but their orders must be reviewed by management before the order will be placed on the site and sent to the jobber. Managers can approve their own orders or not, depending on what the upper shop management decides. An example might be that a painter could approve his orders for the paint shop, but not the detail department.

Create Standard Orders—The shop or jobber can set up the every day orders that the shop normally orders a lot of. An example might be TINTS for the mixing machine, or CLEARS and HARDNERS that the shop uses every day. The idea is that any supplies that are used day in and day out could have a standard order built for those supplies.

View and Approve orders created by your buyers—This is where upper management processes the buyer's orders. Management can approve or modify the order or simply deny the order. The order is shown item by item, so if just some of the items need to be modified that can be done quickly.

Usage Reports—This allows management to see exactly what has been ordered. Date, P.O. number, manufacture, or product codes are some of the ways that the jobber or shop can view their usage report.

Budget Reports—This section gives the percentage of the different departments that has been used in a given period. So it might say something like this: paint shop 78% of budget. Giving management a quick thumb nail idea of where each department is on their purchases for a given period.

Order Status Report—The shop comes to this screen to see each order in it's entirety as to what has been ordered in each given period. This is helpful in seeing who has ordered what when.

Advantages

The invention noted above allows manufactures the opportunity to sell on a national level through existing jobbers, but still offer local service by use of the jobbers, which would not be possible if the manufacturers sold the materials directly via the internet, for example. SupplyLine Affiliates will be all over the nation and the rest of the world supplying the collision centers with their minute to minute supplies as well as weekly and monthly supply orders. However, it should be noted that the only reason SupplyLine would get involved in the daily calls from a collision center is if it was a national player and they needed some help with ordering. However, most of this will be automatically done through the web site and the PALM-type devices.

What the manufactures get out of this is the ability to go to huge users and offer them big deals. Normally when big deals are cut with national players, the people at the shop level suffer for loss of service. The idea under the present invention lets the technician in the shop enjoy the same level of service that he has always had.

Said another way, this new method of distribution will allow a big manufacturing company (hereinafter "Big Manufacturer") to sell their products to a collision shop on a national and regional basis and still have the current jobber stores deliver and bill the goods and services. Big Manufacturer may elect to even carry the receivables of all the products being sold as well as theirs. This is a huge point because Big Manufacturer may only sell paint. There are hundreds of other products that a collision shop uses. Big Manufacturer has to date only been able to cause their products to be used. SUPPLYLINE Jobbers will be able to offer to the shops that the manufacture a way to service the collision center with the paint that the shop uses as well as all the other items that they don't sell. For example Dupont sells paint and only paint. The shops need many other items including sandpaper, tape and glue. The jobber will be there with all the supplies that a shop needs, not just paint. Big company can not offer local service and all the other products that a shop needs. After all they are a manufacture, not a supplier of products.

We think that this new way of doing business will bring radical change in our industry. Business has not been done this way in our industry and to applicant's knowledge over the Internet at all. For example, when you order a book from Barnes and Noble, they don't send the order to the local store to be hand delivered to the buyer. No, they send the order direct to the customer. Same way with GAP clothes, if you order an item over their web site it gets shipped direct to you. Not so with the present invention. The sale goes from the customer to SupplyLineUSA.com Company, (mostly web activity) back to the local distributor then to the customer. In every aspect of business, the order goes form the seller to the purchaser with no stops in between. In our industry, because of the hazardous nature of our products, the normal mode of business does not apply. Back to our idea, this allows the Manufacture to sell to a local company but still service that local company with the local distribution chain already in place.

Even in situations where the manufacture has company owned stores, business is not done the way we are doing business. Big Company (MANUFACTURE) makes a deal with the customer (collision center), and then customer orders Big Company's products with SupplyLine then SupplyLine sends the order back to the local jobber to be filled. This allows Big Company to still make deals with large collision centers and national accounts, but it allows the accounts to be serviced at the local level.

CONCLUSION

In closing, it may be seen that the applicant has developed the concept of providing supply chain management through scanners and barcodes and the management features of the site. Further inventions of the applicant relate to sending the orders from the collision center to the site and on to the jobbers legacy system. While scanners and barcodes are not new, using them to control another companies' inventory is believed to be new. This is a big answer to the shrinking work force in the automotive industry.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing supplies of products to an automotive Collision Center from a plurality of Suppliers, each Supplier having a legacy computer system, said Collision Center utilizing bins for storage of products in its inventory, said method comprising the steps of: establishing an internet web site, said web site supervised by an Order Manager and including a plurality of subsections, at least one of said subsections assigned to at least one of a plurality of Suppliers, each Supplier including unique SKU numbers associated with the products in the bins or the inventories of said Suppliers; providing scannable indicia associated with said Products in the bins of said Collision Center, said scannable indicia corresponding to said SKU numbers; providing a scanner and associated hardware at the location of said Collision Center, said scanner and associated hardware configured to allow one to scan said indicia associated with said products in said bins and to transfer order information associated with said products intended for said bins to said internet web site; and providing a connection between said internet web site and said legacy computer systems of said Suppliers to allow said order information previously transferred to said web site to be entered directly into said legacy computer systems of said Suppliers from said web site.

2. The method as claimed in claim 1, wherein said scannable indicia is a bar code.

3. The method as claimed in claim 2, wherein said scannable indicia is scanned by hardware associated with a personal digital assistant, and then said personal digital assistant is used to transmit orders associated with said indicia into a computer which is itself connected to the internet.

4. The method as claimed in claim 1, wherein said scannable indicia is scanned by hardware associated with a personal digital assistant, and then said personal digital assistant is used to transmit orders associated with said indicia into a computer which is itself connected to the internet.

5. A method for providing supplies of products to an automotive Collision Center from a plurality of Suppliers, each Supplier having a computer system, said Collision Center utilizing bins for storage of products in its inventory, said method comprising the steps of: establishing an internet web site, said web site supervised by an Order Manager and including a plurality of subsections, at least one of said subsections assigned to at least one of a plurality of Suppliers, each Supplier including unique SKU numbers associated with the products in the bins of the inventories of said Suppliers; providing scannable indicia associated with said products in the bins of said Collision Center, said scannable indicia corresponding to said SKU numbers; providing a scanner and associated hardware at the location of said Collision Center, said scanner and associated hardware configured to allow one to scan said indicia associated with said products in said bins and to transfer order information associated with said products intended for said bins to said internet web site; and providing a connection between said internet web site and said computer systems of said Suppliers to allow said order information previously transferred to said web site to be entered directly into said computer systems of said Suppliers from said web site.

6. A method for providing supplies of products to an automotive Collision Center from a plurality of Suppliers, each Supplier having a computer system, said Collision Center utilizing bins for storage of products in its inventory, said method comprising the steps of: establishing an internet web site, said web site supervised by an Order Manager and including a plurality of subsections, at least one of said subsections assigned to at least one of a plurality of Suppliers, each Supplier including unique SKU numbers associated with the products in the bins of the inventories of said Suppliers; providing machine readable information associated with said products in the bins of said Collision Center, said machine readable information corresponding to said SKU numbers; providing an information reading device and associated hardware at the location of said Collision Center, said information reading device and associated hardware configured to allow one to read said information associated with said products in said bins and to transfer order information associated with said products intended for said bins to said internet web site; and providing a connection between said internet web site and said computer systems of said Suppliers to allow said order information previously transferred to said web site to be entered directly into said computer systems of said Suppliers from said web site.

7. The method as claimed in claim 6, wherein said information reading device is a bar code scanner.

\* \* \* \* \*